United States Patent [19]

McDonough

[11] Patent Number: 4,635,891

[45] Date of Patent: * Jan. 13, 1987

[54] MULTIPLE AXIS LINEARLY ADJUSTABLE SUPPORT

[76] Inventor: David C. McDonough, 426 S. First St., Dundee, Ill. 60118

[ * ] Notice: The portion of the term of this patent subsequent to Mar. 11, 2003 has been disclaimed.

[21] Appl. No.: 587,658

[22] Filed: Mar. 8, 1984

[51] Int. Cl.$^4$ .............................................. E04G 3/00
[52] U.S. Cl. .................................... 248/542; 248/287; 411/417
[58] Field of Search ............... 248/542, DIG. 13, 285, 248/286, 287; 403/63, 55, 188; 411/417, 418, 419, 420, 421, 422, 119, 121, 122, 123, 124, 489

[56] References Cited

U.S. PATENT DOCUMENTS

| | | | |
|---|---|---|---|
| 1,285,018 | 11/1918 | Bryant | 248/286 X |
| 1,327,934 | 1/1920 | Alcock | 411/417 X |
| 2,375,931 | 5/1945 | Loewer et al. | 411/417 X |
| 2,431,480 | 11/1947 | Hornsby | 411/123 |
| 3,643,296 | 2/1972 | Kahn | 411/349 X |
| 4,074,537 | 2/1978 | Gronlie | 248/287 |
| 4,366,940 | 1/1983 | Vargus | 248/542 |
| 4,432,525 | 2/1984 | Duvall | 248/287 X |

Primary Examiner—J. Franklin Foss
Assistant Examiner—David L. Talbott

[57] ABSTRACT

A multiple coordinate linearly adjustable support for implements including a block having transversely arranged square bores slidably and non-rotatably receiving complementary square threaded rods with the block locked in position with respect to the rods by opposed lock nuts threaded on the rods. The rods have sides with flat uninterrupted longitudinal surfaces that carry numeric linear measurement indicia to indicate the location of the block along the rods, and unique lock washers with square rod receiving apertures rotationally fastened the lock nuts to the rod and to the block.

10 Claims, 6 Drawing Figures

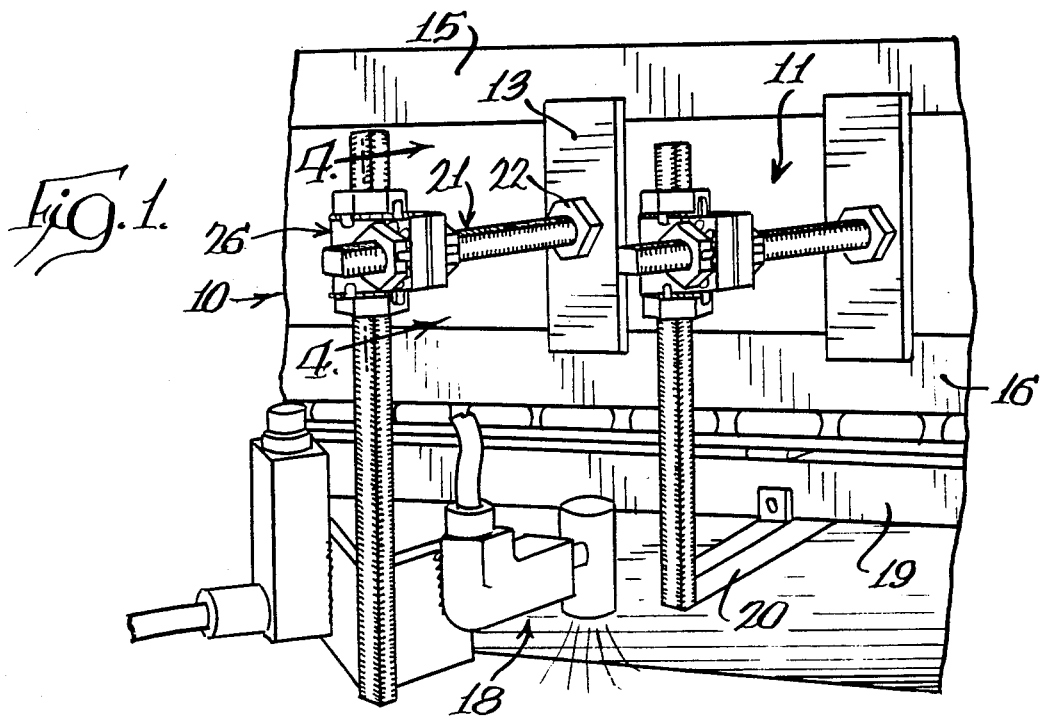
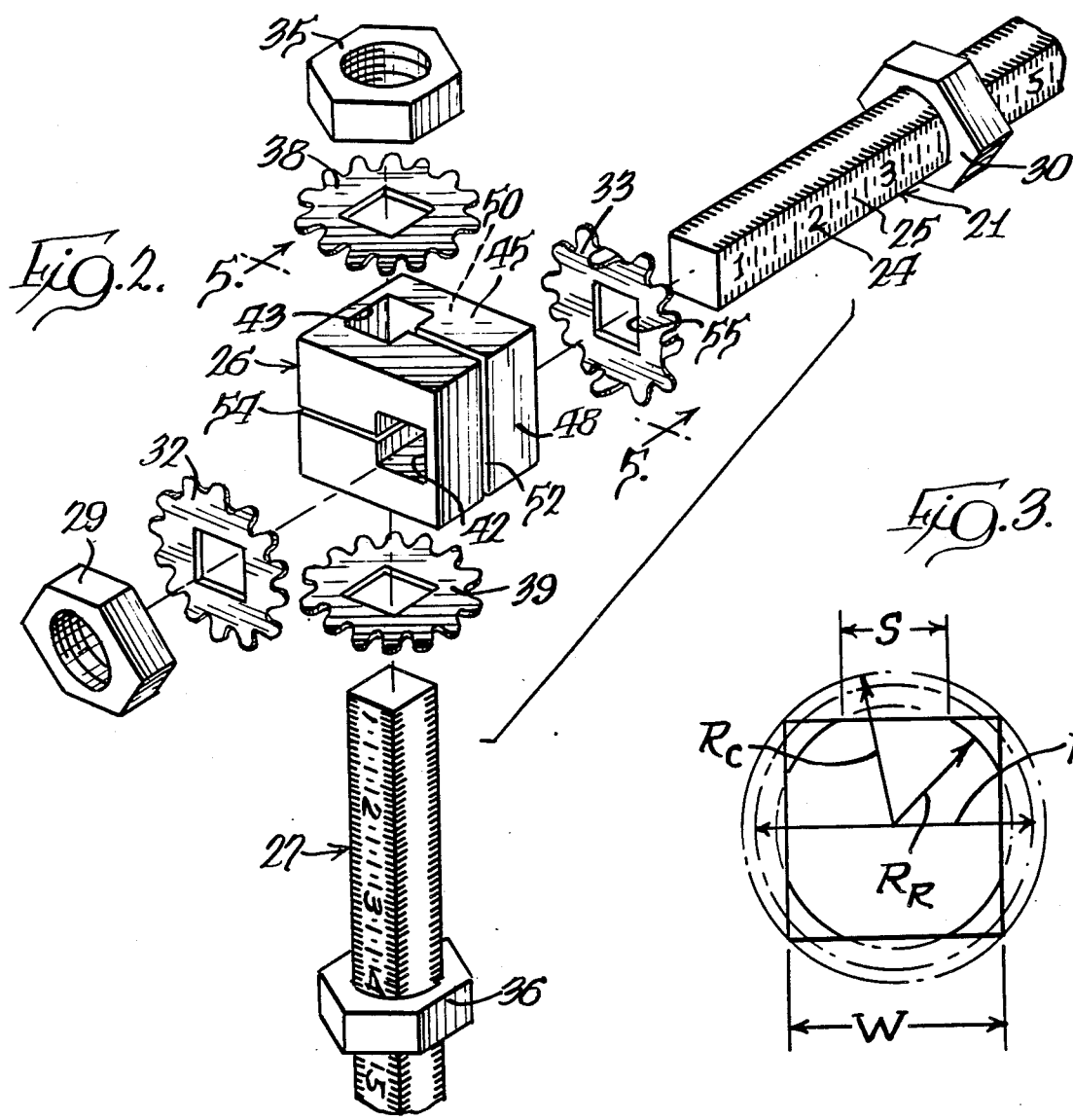

MULTIPLE AXIS LINEARLY ADJUSTABLE SUPPORT

BACKGROUND OF THE PRESENT INVENTION

Orthogonally adjustable supports for tools and work holders have been knowm for many decades and have taken a variety of forms usually dependent upon the loading imposed upon the dual axis support and the accuracy of adjustment, if any, required. In the widely used cross slide arrangement for supporting work holders and tools, linearly reciprocable slides are slidably mounted in a dovetail-type groove and a lead screw rotatably carried by the slide engages a stationary nut member on a relatively fixed base for the slide. The slide in turn may form the base for a cross slide that also carries a rotatable lead screw threadedly engaging a nut member carried by the first slide.

This cross slide arrangement is suitable for heavy duty load applications and is quite capable, with the appropriate gearing and/or associated servo-mechanisms and controls, of providing accurate positioning of the work or tool supported on the cross slides. However, in many applications this degree of precision in positioning the work or tool is not required and the load supported does not require the heavy slide and cross slide members.

A variety of linearly adjustable supports such as rod and rod clamp support structures has been suggested in the past for lighter load applications. In this general class of structures a fixed rod is provided and a rod clamp is adjustably positioned on the rod either with a deformable C-clamp or by a set screw arrangement where a set screw threadedly carried by a rod slide frictionally engages the side of the rod. In some cases an additional linearly adjustable rod passes through the clamp itself to gain an additional axis of adjustability for the support.

While the rod clamp supports have found a considerable degree of success in supporting light-load tools and workpieces, and other implements such as lighting, they have not found any great success in supporting medium or heavy-duty tooling workpieces or implements in the industrial environment because of their inability to positively lock the workpiece either axially or rotationally in its adjusted position and also because of their inability to be adjusted in small increments. These rod clamp support assemblies rely primarily on friction to achieve locking, and hence experience a degradation in performance under higher loads, both linearly and rotationally.

One prior solution to the problem of providing adequate support in intermediate load applications utilizes a square threaded rod with a support member slidably positioned on the rod and located in position by opposed threaded fasteners on the opposite sides of the block. This square rod and sliding support design, however, has not achieved any significant commercial success because of its inability to accurately locate the block on the rod and to positively lock the fasteners with respect to the square rod.

It is the primary object of the present invention to ameliorate the above problems noted in multiple axis supports for intermediate load tools, workpieces and other implements.

SUMMARY OF THE PRESENT INVENTION

In accordance with the present invention, a multiple axis adjustable support is provided for tools, workpieces and other implements that includes one or more supporting blocks each having two transverse square bores, one slidably receiving and supporting the block on a first threaded square rod, and the other slidably receiving an implement-supporting second square threaded rod. The side faces of the square rods are reduced substantially so that an uninterrupted surface is provided on the sides of the rods that carries numeric linear measurement indicia that the user visually registers with the sides of opposed block locking nuts threaded on the rods to determine the position of the block with respect to each of the rods. The block is locked axially in position with respect to each of the rods by the opposed lock nuts that clamp against unique lock washers having square apertures that are slidable on but prevented from rotation with respect to the threaded rods.

The lock nuts and lock washers positively, and not frictionally, lock the supporting block axially along the two orthogonal axes of the rods, and the square configuration of the rods and the receiving bores of the blocks positively prevents any rotational motion of the block or the rods.

Toward these ends and according to the present invention the first square threaded rod is carried by a fixed base and slidably receives the support block through one of the transverse square bores therein that are slightly larger and complementary to the cross-section of the threaded rods. The block is box-like in configuration and it has two slots, each extending across the block transversely through one bore and longitudinally into the other bore. These slots provide resiliency to the block, constructed of a low-carbon steel, that assists in performing two important functions. Firstly, they provide resiliency to the block that assists in tensioning the lock nuts in position, and secondly, they enable the block to clamp against two sides of the square threaded support rods.

The second square threaded support rod is slidably received in the other square bore in the block and it may have a fixture or a bracket on the end thereof to which the tool workpiece or implement may be attached, or alternatively it may carry another support block that in turn carries another rod to achieve additional axis movement. Both of the rods have a pitch circle diameter sufficiently great with respect to the width of the rods (i.e. the distance between opposed flat faces) so that a substantial portion of the side faces of the rods is uninterrupted by threads and forms a flat, smooth surface on which the numeric measurement indicia are stamped. The block is axially adjusted along the first rod and with respect to the second rod by the two pairs of lock nuts threaded on the rod, on the opposite sides of the support block. The block is moved axially on each rod by loosening and backing off one of the lock nuts until the backed-off lock nut reaches the desired position on the rod determined visually by the outer transverse plane of the lock nut intersecting the indicia graduations on the side of the rod. Thereafter, the block is slid down the rod into engagement with this relocated lock nut and the other lock nut is threaded down tightly against the opposite side of the block, positively locating the block in a new position along the rod. The other rod that supports the implement is axially relocated with respect to the block along a transverse axis in the same manner.

There is some tendency for the lock nuts to loosen, particularly when subjected to vibrating loads and the present lock washer solves this problem in an efficient and simple manner. A lock washer is provided between each of the lock nuts and the support block and consists of a single generally circular flat metal stamping having a central rectangular aperture adapted to be slidably received on the threaded rectangular support rods and a plurality of radially directed deformable fingers. The fingers are sized with respect to the size of the block periphery and the lock nuts so that the fingers may be deformed or bent across the sides of the block and across the hexagonal flats on the lock nuts. Because of the rectangular rod receiving apertures in the lock nuts, they cannot rotate with respect to the rods so that upon deforming several fingers across the flats on the lock nuts, the lock nuts are prevented from rotating with respect to the threaded rods. By also deforming some of the lock washer fingers across the sides of the support block, the lock nuts are further locked from rotation by the support block itself.

In another embodiment of the present invention, a second square bore is formed in the block coaxially on the each axis of the main bores, rotated 45 degrees with respect to the main bores and this permits the block to be rotationally positioned in five angular positions with respect to the rods in a simple and inexpensive fashion. By forming these two square bores along the same axis for each of the two threaded rods, the number of angular positions on each of the two orthogonal axes is doubled. Forming the dual square bores on each axis is quite simple by making a dual pass with a suitable broaching tool.

BRIEF DESCRIPTION OF THE DRAWINGS

FIG. 1 is the perspective view of a portion of a conveyor line having two multiple axes linearly adjustable supports according to the present invention;

FIG. 2 is an exploded perspective of one of the linearly adjustable supports illustrated in FIG. 1 according to the present invention;

FIG. 3 is a partly fragmentary plan view taken generally along line 3—3 of FIG. 1 illustrating the lock washer configuration;

DETAILED DESCRIPTION OF THE PREFERRED EMBODIMENT

Figure 4:
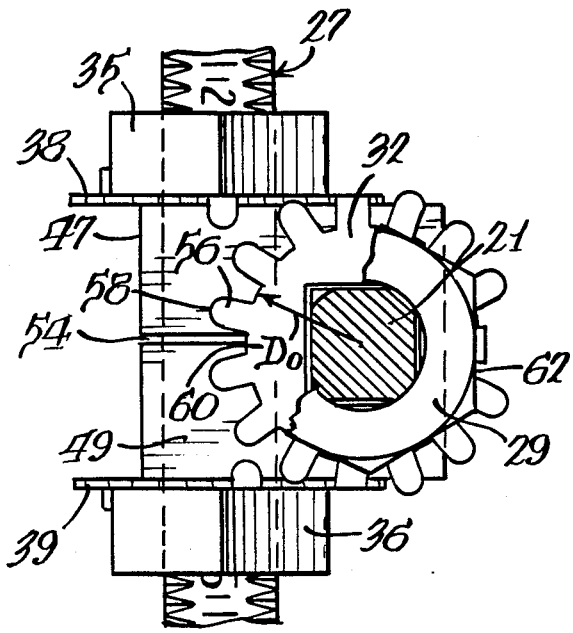
FIG. 4 is a longitudinal section generally similar to FIG. 3 taken through the mid-point of the vertical square threaded rod illustrating the block slots.
Figure 5:
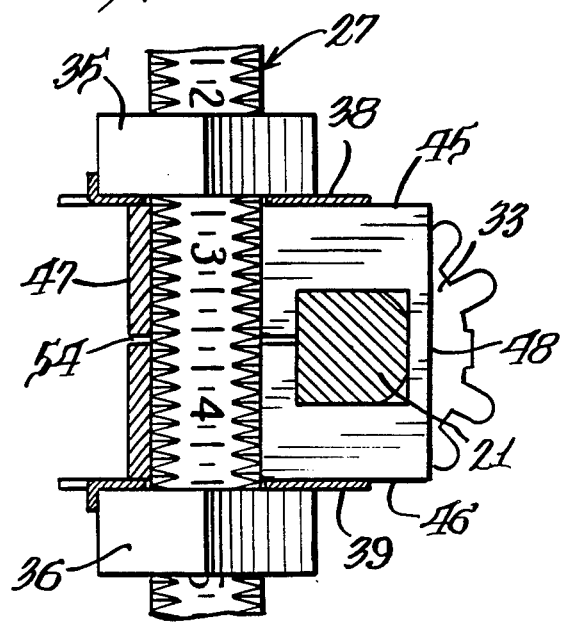
FIG. 5 is an enlarged plan view of a support block according to another embodiment of the present invention that permits rotational adjustment of the block relative to the square threaded support rods.

Referring the the drawings and particularly FIGS. 1 to 4, two dual axis linearly adjustable support assemblies 10 and 11 are illustrated, each supported on a fixed steel support plate 13 welded to horizontal side rails 15 and 16 of an industrial conveyor for a paperboard carton setup machine line. The support assembly 10 carries a glue gun 18 while the adjustable support assembly 11 carries and adjustably positions a folding plow bar 19 fixed to a cross member 20 carried by the lower end support assembly 11.

Insofar as the present invention is concerned the support assemblies 10 and 11 are identical and reference will be made to the support assembly 10 hereinafter with the understanding that it applies to support assembly 11 as well.

As seen in FIGS. 1 and 2, the support assembly 10 generally includes a horizontal rod 21 having a square cross-section that is fixed in an aperture in vertical plate 13 by opposed hexagonal threaded lock nuts 22 engaging the opposite sides of fixed plate 13, rectangular block 26, adjustable square threaded rod 27, lock nuts 29 and 30 threadedly engaged on the rod 21 and clamped against lock washers 32 and 33 on opposite sides of block 26, and lock nuts 35 and 36 threaded on rod 27 that clamp lock washers 38 and 39 against opposed sides of block 26. As seen in FIG. 3, the root radius Rr of the threads on the rods 21 and 27 is sufficiently great so that a flat uninterrupted surface S extends across a major portion of the width W of the rods. This surface S carries numerical indicia 24 and intermediate graduations 25 to enable the operator to accurately locate block 26 along rod 21 and the rod 27 in the block.

The square cross-section of rods 21 and 27 along with the appropriate selection of root diameter described in connection with FIG. 3 enable the indicia and graduations 24 and 25 to be easily seen at the axial edges of the lock nuts 29, 30, 35 and 36 away from the block 26 to accurately position the block member 26 in any desired position.

The lock nuts 29 and 30, 32 and 36 are hexagonal in configuration and have internal threads complementing the threads on the rods 21 and 27 in the sense that they have the same pitch circle $D_{pc}$ and thread shape and designation.

The block 26 is constructed of a mild steel and has a first square through bore 42 parallel but offset from the central horizontal axis of block 26 and a second vertical square through bore 43 non-intersecting with bore 42 and parallel to but offset from the vertical central axis of block 26.

Block 26 has opposed top and bottom walls 45 and 46 interconnected by opposed sidewall pairs 47, 48 and 49, 50. A first slot 52 extends from sidewall 48 completely through the block vertically, transversely across bore 42 and longitudinally into the side of bore 43. A second slot 54 extends from block sidewall 47 completely horizontally through the block, transversely across bore 43 and longitudinally into the side of bore 42 as seen in FIGS. 2, 3 and 4. The slots 52 and 53 provide horizontal and vertical resilience for the block 26 that enable the block to clamp on the rods 21 and 27 and also to tension the lock nuts 29, 30, 35 and 36 to maintain them in position in the event that the lock washers 32, 33, 38 or 39 are not engaged.

The lock washers 32, 33, 38 and 39 are identical in construction and each includes a square aperture 55 the same size as the rods 21 and 27, except for a slight clearance. The configuration of apertures 55 prevents the lock washers from rotating with respect to the rods. The lock washers are each one-piece metal stampings generally annular in configuration and have fifteen radially projecting deformable fingers 56 that have arcuate outer edges 58 having a radius equal to one-half the width of the fingers projecting from a central annular portion 60 with an outer diameter $D_o$, as seen in FIG. 4 slightly less than the diameter of the lock nuts 29, 30, 35 and 36 across their flats. The outer diameter of the washers at the ends of the fingers 56 is greater than the spacing between the block walls 45 and 46. This configuration of the fingers 56 enables them to be bent over both flats 62 on the sides of the lock nuts and also the walls 45 and 46, thereby attaching the lock washer to both the lock nut and the block 26. In this way the threaded rods 21 and 27 and the block 26 resist rotation of the lock nuts.

During assembly one of the lock nuts along with lock washer 33 are threaded and slid on rod 21 until the outer end of the lock nut 21 is aligned with a predetermined indicia or graduation on the side of the rod 21. Thereafter the block 26 is slid onto the rod 21 and backed up loosely with lock washer 32 and lock nut 21 engaging lock washer 32 against the side of the block 26. Thereafter rod 27 with the lock nut 36 previously positioned by the operator at the appropriate indicia aligned with its lower edge is slid through bore 43. Then the lock nut 35, with washer 38, is threaded down on rod 27 until it begins to tighten lock washer 38 against block upper surface 45. Lock nut 29 on rod 21 is then brought more tightly into engagement with the block 26 assuring intimate contact between the lock nut 30 and block 26, being careful not to rotate accurately positioned lock nut 30, compressing block 26 horizontally, reducing the width of slot 52 and clamping bore 43 against rod 27. In this position, block 26 is accurately positioned horizontally. Then lock nut 35 is further rotated, being careful not to reposition or rotate lock nut 36, sufficiently to compress block 26 partly closing slot 54 thereby clamping block 26 against rod 21 eliminating rotational play between the block 26 and rod 21.

If it is desired that the block 26 be repositioned, for example, if the glue gun 10 is desired to be moved two inches horizontally closer to the side rails 15 and 16 as seen in FIG. 1, the position of the outer edge of lock nut 30 is noted viewing indicia 24 and the amount of horizontal movement of the glue gun 18 desired, i.e. two inches, is added to the noted position to determine the new position. Then lock nut 30 is backed away from the block 26 until its outer transverse edge is aligned with the new desired position. Then the block 26 is slid along rod 21 until in engagement with newly positioned lock nut 30 and its washer 33. The lock nut 29 and lock washer 32 are then clamped against the other side of the block. Note that while loosening the nuts 29 and 30 removes the clamping force on the vertical rod 27, it does not permit any axial movement of rod 27 with respect to the block 26 and hence it does not affect its positioning and when the lock nut 29 is reclamped, block 26 again clamps rod 27 eliminating any rotational play between the block 26 and rod 27. The rod 27 may be readjusted with respect to the block 26 in the same manner as described with respect to movement of the block 26 along rod 21 so that no repetition of this procedure is believed necessary.

Once the block 26 has been positioned with respect to the rods 21 and 27 as desired, the fingers on the lock washers 32, 33, 38 and 39 are bent 90 degrees by a suitable mallet with respect to the planes of the lock washers across the suraces 45 and 46 of the block and across the flats on the lock nuts securing the lock nuts from rotation.

Figure 6:
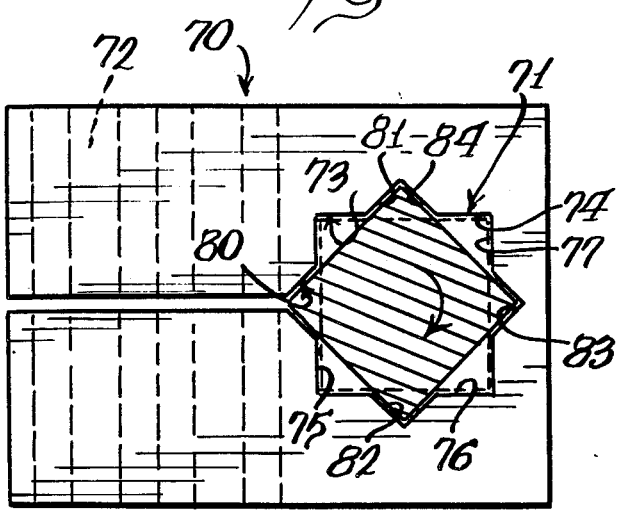
FIG. 6 is an enlarged plan view of a support block according to another embodiment of the invention adapted to slidably receive either square or round threaded support rods.

A modified form of block 26 is illustrated in FIG. 6 and designated therein by the reference numeral 70. The block 70 is identical in configuration to the block 26 except for the configuration of the transversely arranged bores 71 and 72 therein. Apertures 71 and 72 are identical so that this description will be confined to aperture 71. Bore 71 is defined by a first square bore 73 including flat walls 74, 75, 76 and 77 identical to bore 42 in the embodiment of Figs. 1 to 4, and a second square bore 80 defined by flat walls 81, 82, 83 and 84.

The bores 71 and 72 are adapted to receive rods identical in configuration to rods 21 and 27 having a width substantially equal to the width of each of the bores 73 and 80. The bore 80 can be easily formed by broaching after the initial square bore 73 is formed. The dual bores 71 and 72 permit the block 70 to be positioned in eight different positions with respect to each of the rods 21 and 27, thereby permitting a wide variety of angular orientations for the supported tool without detracting from the present support block's capability of positively locking to the rods 21 and 27.

Figure 7:
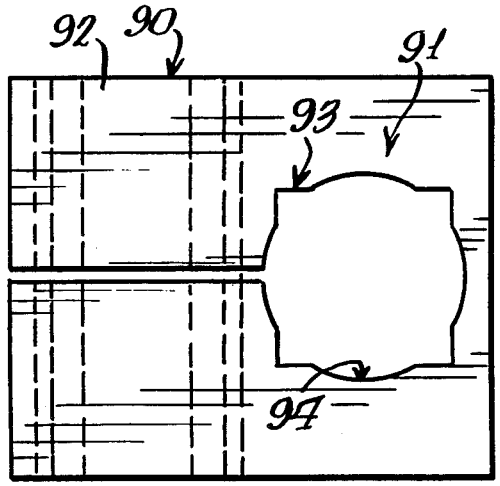

A further embodiment of the present block 26 is illustrated in FIG. 7 and designated by the reference numeral 90. Block 90 is identical in construction to block 70 except for the configuration of the transverse through bores 91 and 92 that are identical in construction to one another and each is seen to include a rectangular bore 93 and a circular bore 94 formed on the same axis therewith. The configuration of bores 91 and 92 enable either a round rod or a square rod to be positioned in the block and the advantage in permitting a round rod to be positioned in one of the bores 91 and 92 is that it enables the block 26 to have an infinitely variable angular positioning with respect to the rods, although it does so by sacrificing some rotational locking with respect to the rod.

I claim:

1. A support for adjustably positioning an implement along at least one axis, comprising: a first threaded rod having a square cross-section with one end thereof adapted to be connected to a fixed supporting structure, a block member having a bore therethrough having a square cross-section slidably receiving and non-rotatable on the threaded rod, a first threaded lock nut threadedly received on the rod and engageable with one side of the block member to axially lock the block member in one direction, a second threaded lock nut threadedly received on the rod and engageable with the other side of the block member to axially lock the block member in the other direction, said block having a second bore therethrough generally transverse to the first bore also having a square cross-section, a second threaded square rod slideably received in the second bore, third and fourth threaded lock nuts threadedly received on the second rod each engageable with opposite sides of the block member to lock the second rod axially with respect to the block member, at least one of the sides of the first rod having a flat uninterrupted surface extending longitudinally for a substantial length thereof, numerical indicia on the flat uninterrupted surface, and edge means on one of the threaded nuts to provide an indicator with the numerical indicia for the position of the block member along the rod, said numerical indicia being calibrated to directly read at said one nut edge means the distance from the fixed supporting structure to the centerline of the second rod.

2. A support for adjustably positioning an implement along at least one axis, as defined in claim 1, wherein the block member has a slot extending through one side thereof completely through the bore therethrough to assist in locking the lock nuts against the sides of the block member.

3. A support for adjustably positioning an implement along at least one axis, as defined in claim 1, including a first slot extending from one side of the block member transversely through the first bore and longitudinally into the second bore, and a second slot extending from another side of the block member transversely through the second bore and longitudinally into the first bore.

4. A support for adjustably positioning an implement along at least one axis, comprising: a threaded rod having a non-circular cross-section with one end thereof adapted to be attached to a fixed supporting structure, a block member having a bore therethrough with a non-circular cross-section non-rotatably slideable on the threaded rod, a first threaded lock nut threadedly received on the rod for axially locating the block member in one direction along the rod, a second threaded lock nut threadedly received on the rod for axially locating the block member in the other direction along the rod, and a lock washer positioned between at least one of the lock nuts and the block member, said lock washer being planar in configuration and having a non-circular opening therein that is complementary in shape to the non-circular cross-section of the threaded rod so that the lock washer is non-rotatable with respect to the rod, said lock washer having a plurality of generally radial fingers extending outwardly therefrom, said fingers being deformable axially over the periphery of the adjacent lock nut to prevent the lock nut from rotating with respect to the rod.

5. A support for adjustably positioning an implement along at least one axis, as defined in claim 4, wherein the lock nuts have an outer polygonal configuration defined by a plurality of flats, said block member having an outer configuration defined by flat surfaces, said projecting fingers on the lock washer having a radial length sufficient to extend outwardly across both the lock nut flats and the block member flat surfaces so the fingers may be deformed axially over the lock nut flats or one of the block member surfaces to rotationally lock the lock washer to both the adjacent lock nut and the block member.

6. A support for adjustably positioning an implement along at least one axis, as defined in claim 4, wherein said block member has a second bore therethrough generally transverse to the first bore also having a square crosssection, a second threaded square rod slideably received in the second bore, third and fourth threaded lock nuts threadedly received on the second rod each engaging one side of block member to lock the second rod axially with respect to the block member.

7. A support for adjustably positioning an implement along at least one axis, as defined in claim 4, wherein said block member has a second bore therethrough generally transverse to the first bore also having a square crosssection, a second threaded square rod slideably received in the second bore, third and fourth threaded lock nuts threadedly received on the second rod each engaging one side of block member to lock the second rod axially with respect to the block member, a first slot extending from one side of the block member transversely through the first bore and longitudinally into the second bore, and a second slot extending from another side of the block member transversely through the second bore and longitudinally into the first bore.

8. A support for adjustably positioning an implement along at least one axis, comprising: a non-deformable threaded rod having a square cross-section with one end thereof adapted to be connected to a fixed supporting structure, a block member having a non-deformable bore therethrough having a square cross-section slideable and non-rotatable on the threaded rod, a first threaded lock nut threadedly received on the rod and engageable with one side of the block member to axially lock the block member in one direction, a second threaded lock nut threadedly received on the rod and engageable with the other side of the block member to axially lock the block member in the other direction, a second bore in block member having a square cross-section, said second bore being coaxial with, of equal size and rotationally related to the first bore, said square threaded rod being positionable in eight different rotational positions in the first and second bores to position an implement carried by the block member in a variety of rotational positions, said block having a slot extending from one side thereof longitudinally into the first and second bores, and means clamping the block in a direction transverse to the slot to clamp the rod in any of said eight positions.

9. A support for adjustably positioning an implement along at least one axis, comprising: a threaded rod having a square cross-section having one end thereof adapted to be connected to a fixed supporting structure, a block member having a first bore therethrough having a square cross-section slidable and non-rotatable on the first threaded rod, a first threaded lock nut threadedly received on the first rod and engageable with one side of the block member to axially lock the block member in one direction, a second threaded lock nut threadedly received on the first rod and engageable with the other side of the block member to axially lock the block member in the other direction, said block member having a second bore therethrough generally transverse to the first bore also having a square crosssection, a second threaded square rod slideably received in the second bore, third and fourth threaded lock nuts threadedly received on the second rod, each engageable with one side of block member to lock the second rod axially with respect to the block member, a first slot extending from one side of the block member transversely through the first bore and longitudinally into the second bore, and a second slot extending from another side of the block member transversely through the second bore and longitudinally onto the first bore, each of the first and second threaded rods having an uninterrupted flat surface along at least one side thereof, a plurality of numerical linear measurement indicia on each of the rod flat surfaces, and edge means on one of the first and second and one of the third and fourth lock nuts to determine with the indicia the linear position of the block member on the first rod and the linear position of the second rod with respect to the block member, said numerical indicia being calibrated to directly read at said one nut edge means the distance from the fixed supporting structure to the centerline of the second rod and the position of the second rod.

10. A support for adjustably positioning an implement along at least one axis, comprising: a threaded rod having a square cross-section with one end thereof adapted to be connected to a fixed supporting structure, a block member having a first bore therethrough having a square cross-section slidable and non-rotatable on the first threaded rod, a first threaded lock nut threadedly received on the first rod and engageable with one side of the block member to axially lock the block member in one direction, a second threaded lock nut threadedly received on the first rod and engageable with the other side of the block member to axially lock the block member in the other direction, said block member having a second bore therethrough generally transverse to the first bore also having a square cross-section, a second threaded square rod slideably received in the second bore, third and fourth threaded lock nuts threadedly received on the second rod, each engageable with one side of block member to lock the second rod axially with respect to the block member, a first slot extending from one side of the block member transversely through the first bore and longitudinally into the second bore, and a second slot extending from another side of the block member transversely through the second bore and longitudinally into the first bore, each of the first and second threaded rods having an uninterrupted flat surface along at least one side thereof, a plurality of numerical linear measurement indicia on each of the rod flat surfaces, edge means on one of the first and second and one of the third and fourth lock nuts to determine with the indicia the linear position of the block member on the first rod and the linear position of the second rod with respect to the block member, said numerical indicia being calibrated to drirectly read at said one nut edge means the distance from the fixed supporting structure to the centerline of the second rod and the position of the second rod with respect to the block member, and a lock washer between each of the lock nuts and the block member, each of said lock washers having a plurality of radially extending deformable fingers extending therefrom, said lock nuts having an outer polygonal configuration defined by a plurality of flats, said block member having an outer configuration defined by flat surfaces, said projecting fingers on the lock washers having a radial length sufficient to extend outwardly across both the lock nut flats and the block member float surfaces so the fingers may be deformed axially over the lock nut flats and the block member surfaces to rotationally lock the lock washer to both the adjacent lock nut and the block member.

* * * * *